UNITED STATES PATENT OFFICE.

RUDOLPH WEIMER, OF SHEBOYGAN, WISCONSIN.

SUBSTITUTE FOR TIN OXID USED FOR ENAMELING METAL WARE.

932,839. Specification of Letters Patent. Patented Aug. 31, 1909.

No Drawing. Application filed October 7, 1908. Serial No. 456,585.

*To all whom it may concern:*

Be it known that I, RUDOLPH WEIMER, residing in Sheboygan, in the county of Sheboygan and State of Wisconsin, have invented new and useful Improvements in Substitutes for Tin Oxid Used for Enameling Metal Ware, of which the following is a description.

This invention relates to improvements in the art of enameling metal ware, and has for its object to provide an inexpensive substitute for tin oxid, or like ingredient, which is one of the most expensive chemicals used in the composition of matter used in white enameling processes.

In making a composition of matter to be used in enameling metal ware white, either tin oxid, cryolite or phosphate of calcium are used as one of the ingredients of the composition. Tin oxid produces the best white surface and has the proper luster and covering quality. Cryolite produces a good quality of enamel and phosphate of calcium a rather inferior quality, gray in color. The first two ingredients are comparatively very expensive and the latter ingredient does not produce a good quality of enamel whereas the substitute I have discovered produces an enamel of very good quality and is comparatively inexpensive in cost. This substitute consists of the following ingredients, combined in substantially the proportions stated, viz:

| | |
|---|---|
| Antimony oxid | 70 parts. |
| Caustic soda | 28 parts. |
| Chile saltpeter | 22 parts. |
| Kaolin | 10 parts. |
| Barytes | 10 parts. |

The caustic soda, Chile saltpeter, barytes and kaolin are put in boiling water to dissolve and mix together and then antimony oxid is added to the composition and thoroughly mixed to form a combination with the other elements. As soon as the composition is air dry it is then roasted in a hot roasting oven to eliminate all of the fumes, gas, water, air, etc., and the mass is then ground and is ready for use.

If desired the substitute may be used in part with tin oxid or cryolite and very good results obtained at a saving in cost proportionate to the amount of the substitute used.

It is to be understood that the proportions named may be varied without departing from the spirit and scope of the invention.

What I claim as my invention is:

1. The herein described substitute for tin oxid, or like ingredients for enameling metal ware, consisting of antimony oxid, caustic soda, Chile saltpeter, kaolin, and barytes.

2. The herein described substitute for tin oxid, or like ingredients for enameling metal ware, consisting of seventy parts antimony oxid, twenty-eight parts caustic soda, twenty-two parts Chile saltpeter, ten parts kaolin, and ten parts barytes.

3. The herein described substitute for tin oxid, or like ingredient for enameling metal ware, being a composition in the condition of having been boiled, roasted and ground and consisting of seventy parts antimony oxid, twenty-eight parts caustic soda, twenty-two parts Chile saltpeter, ten parts kaolin, and ten parts barytes.

4. The herein described substitute for tin oxid, or like ingredient for enameling metal ware, consisting of boiled, roasted and ground antimony oxid, caustic soda, Chile saltpeter, kaolin, and barytes.

In testimony whereof, I affix my signature, in presence of two witnesses.

RUDOLPH WEIMER.

Witnesses:
JOHN M. DETLING,
GEO. H. DETLING.